United States Patent [19]
Abe et al.

[11] Patent Number: 5,633,454
[45] Date of Patent: May 27, 1997

[54] PINHOLE INSPECTING APPARATUS

[75] Inventors: Hiroshi Abe, Tokushima; Kazuhiko Ishio, Kusatsu; Yoshihiro Murakawa, Shiga; Akira Yamamoto, Osaka, all of Japan

[73] Assignee: Otsuka Pharmaceutical Factory, Inc., Tokushima, Japan

[21] Appl. No.: 537,916

[22] PCT Filed: Mar. 30, 1995

[86] PCT No.: PCT/JP95/00603

§ 371 Date: Nov. 1, 1995

§ 102(e) Date: Nov. 1, 1995

[87] PCT Pub. No.: WO95/27193

PCT Pub. Date: Oct. 12, 1995

[30] Foreign Application Priority Data

Apr. 4, 1994 [JP] Japan ................. 6-065926

[51] Int. Cl.⁶ ............... G01M 3/04; G01M 3/20
[52] U.S. Cl. ................. 73/40; 73/40.7; 73/49.3; 73/52
[58] Field of Search ............... 73/40, 40.7, 41, 73/45, 45.1, 45.4, 49.2, 52, 49.3

[56] References Cited

U.S. PATENT DOCUMENTS

| | | | |
|---|---|---|---|
| 3,591,944 | 7/1971 | Wilcox | 73/49.3 X |
| 3,744,210 | 7/1973 | O'Lenick et al. | 73/49.3 X |
| 5,029,463 | 7/1991 | Schvester et al. | 73/45.4 X |

FOREIGN PATENT DOCUMENTS

| | | | |
|---|---|---|---|
| 59191 | 5/1979 | Japan | 73/40.7 |
| 158533 | 9/1983 | Japan | |
| 18851 | 4/1987 | Japan | |
| 79635 | 3/1989 | Japan | 73/40.7 |

*Primary Examiner*—Hezron E. Williams
*Assistant Examiner*—Daniel S. Larkin
*Attorney, Agent, or Firm*—Sughrue, Mion, Zinn, Macpeak & Seas

[57] ABSTRACT

A pinhole inspecting apparatus is provided which can accurately and speedily inspect a pinhole on a closed container.

The pinhole inspecting apparatus of the present invention comprises a pallet 1 for dischargeably containing a closed container 11 filled with a gas, the pallet 1 having a suction hole 13 such that when the suction hole 13 is closed the interior of the pallet is brought in closed condition, a gas leakage detecting unit 2 adapted to be connected at an inspecting position to the suction hole 13 for communication with the interior of the pallet 1, such that when a gas of the same kind as the first mentioned gas is present in that interior, the gas leakage detecting unit generates an analog signal having a voltage corresponding to amount of the leakage of the gas per unit time, an A/D converter 3 for converting the analog signal into a digital signal, and a first arithmetic unit 4 for finding from the digital signal a slope of a regression line representing the relationship between voltage and time, and calculating the difference between the value of the slope and a maximum slope value which has been preliminarily inputted with respect to a regression line for the same kind of gas in the air as the first mentioned gas, the first arithmetic unit being further operative to output an abnormality signal when the difference falls out of an allowable range therefor.

4 Claims, 3 Drawing Sheets

PINHOLE INSPECTING APPARATUS

TECHNICAL FIELD

The present invention relates to a pinhole inspecting apparatus for inspecting a pinhole of a flexible closed container.

BACKGROUND ART

In plastic bags in which a tablet or powder drug, for example, is to be contained in closed condition, the presence of any pinhole may lead to a very critical situation. In the case of such plastic bags, therefore, it is necessary to inspect the pinhole strictly.

In a conventional known pinhole inspecting method, a substance which is liable to change in color tone under oxygen or humid conditions, for example, is contained in closed condition in a packaging container, then it is judged on the basis of change in the color tone of the substance whether or not the pinhole or the like is present. Furthermore, a pinhole inspecting method in the case of a rigid container is known in which the container is filled with an inspecting gas under pressure and any leakage gas is inspected by a gas detector to find whether or not a pinhole is present. The gas detector converts any inspecting gas leakage into an electric signal corresponding to amount of the leakage per unit time.

In Japanese Patent Application Nos. 5-344297 and 5-339527, there is disclosed a method and an apparatus, developed by the present inventor, for inspecting a pinhole of a flexible container, such as plastic bag etc., by using a gas detector. In this pinhole inspecting method, any possible leakage of inert gas from an inert gas-filled, closed plastic bag is electrically checked. According to the inspecting method, a threshold value corresponding to a change in electrical conditions caused by environmental change is preliminarily determined for each measurement, and it is judged by checking that the measured value has exceeded the threshold value or otherwise whether or not a gas leakage or a pinhole is present.

In the foregoing pinhole inspecting method, since it is judged whether or not the measured value has exceeded the threshold value, even if a pinhole does exist, it is necessary to wait long until the measured value has reached the threshold value. Therefore, such a problem arises that considerable time is required for quality judgement with respect to containers, and this adversely affects the productivity of the whole manufacturing line.

Furthermore, for example, in the case that the same kind of gas as the gas in the container exists in the ambient atmosphere of the container, namely the object for measurement, the gas will be detected even if a pinhole of the container is not present. Therefore, such a problem arises that it becomes difficult to inspect a pinhole accurately and reliably, thus resulting in drop of reliability of inspection.

An object of the present invention is to provide, with a view to eliminating such conventional problems, a pinhole inspecting apparatus which enables accurate and rapid inspection of pinhole of a closed container so as to satisfy recent requirements of strict quality, performance and rapidity.

DISCLOSURE OF THE INVENTION

In order to accomplish the foregoing object, a pinhole inspecting apparatus according to a first embodiment of the present invention comprises a pallet for dischargeably containing a closed container filled with a gas, the pallet having a suction hole, a gas leakage detecting unit adapted to be connected at an inspecting position to the suction hole for communication with the interior of the pallet, such that when a gas of the same kind as said gas is present in that interior, the gas leakage detecting unit generates an analog signal having a voltage corresponding to amount of the leakage of the gas per unit time, an A/D converter for converting the analog signal into a digital signal, and a first arithmetic unit for finding from the digital signal a slope of a regression line representing the relationship between a voltage corresponding to the magnitude of the signal and time, and calculating the difference between the value of the slope and a maximum slope value which has been preliminarily inputted with respect to a regression line for the same kind of gas in the air as said gas, the first arithmetic unit being further operative to output an abnormality signal when the difference falls out of an allowable range therefor.

According to a second embodiment of the present invention, the pinhole inspecting apparatus comprises a pallet for dischargeably containing a closed container filled with a gas, the pallet having a suction hole, a gas leakage detecting unit adapted to be connected at an inspecting position to the suction hole for communication with the interior of the pallet, such that when a gas of the same kind as said gas is present in that interior, the gas leakage detecting unit generates an analog signal having a voltage corresponding to amount of the leakage of the gas per unit time, an A/D converter for converting the analog signal into a digital signal, and a second arithmetic unit for calculating the difference between said digital signal and a previous digital signal at a point of time traced back a predetermined time from the time of detection of the data on the basis of which said digital signal is outputted, the second arithmetic unit being further operative to output an abnormality signal when it is determined that there is a difference falling out of an allowable range between said difference and, for the same kind of gas present in the air as said gas, a maximum value preliminarily inputted with respect to differences between similar digital signals at the same time interval as the above-mentioned predetermined time.

According to a third embodiment of the present invention, the pinhole inspecting apparatus comprises a pallet for dischargeably containing a closed container filled with a gas, the pallet having a suction hole, a gas leakage detecting unit adapted to be connected at an inspecting position to the suction hole for communication with the interior of the pallet, such that when a gas of the same kind as said gas is present in that interior, the gas leakage detecting unit generates an analog signal having a voltage corresponding to amount of the leakage of the gas per unit time, an A/D converter for converting the analog signal into a digital signal, a first arithmetic unit for finding from the digital signal a slope of a regression line representing the relationship between a voltage corresponding to the magnitude of the signal and time, and calculating the difference between the value of the slope and a maximum slope value which has been preliminarily inputted with respect to a regression line for the same kind of gas in the air as said gas, the first arithmetic unit being further operative to output an abnormality signal when the difference falls out of an allowable range therefor, and a second arithmetic unit for calculating the difference between said digital signal and a previous digital signal at a point of time traced back a predetermined time from the time of detection of the data on the basis of which said digital signal is outputted, the second arithmetic unit being further operative to output an abnormality signal when it is determined that there is a difference falling out of an allowable range between said difference and, for the same kind of gas present in the air as said gas, a maximum value preliminarily inputted with respect to differences between similar digital signals at the same time interval as the above-mentioned predetermined time.

Further, in a fourth embodiment of the present invention, helium gas is employed as the gas.

According to the present invention, it is possible to inspect a pinhole of closed container under conditions free from any environmental influence. Namely, the present invention permits accurate and reliable inspection of pinhole of closed container without being influenced by any environmental change, for example, presence or non-presence in the air of the same kind of gas as the gas sealed in the closed container.

EMBODIMENTS

Hereinafter, an embodiment of the present invention is described referring to the accompanying drawings.

Figure 1:
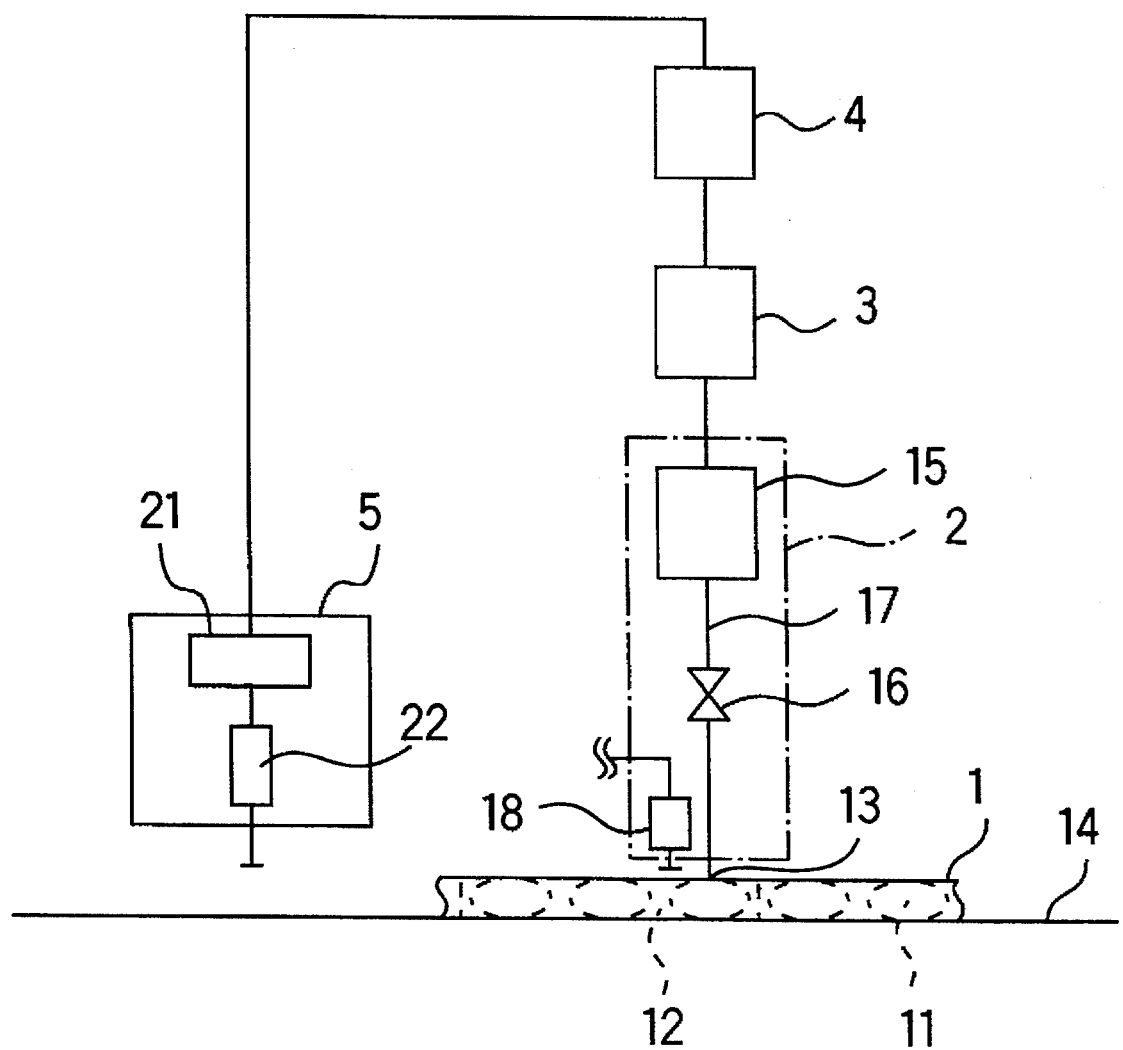
FIG. 1 is a diagram schematically showing a pinhole inspecting apparatus representing a first or a fourth embodiment of the present invention.

FIG. 1 illustrates a pinhole inspecting apparatus according to a first or a fourth embodiment of the present invention. In this embodiment, the apparatus comprises a pallet 1, a gas leakage detecting unit 2, an A/D converter 3, a first arithmetic unit 4, and a removing unit 5.

The pallet 1 has a chamber 12 for dischargeably containing therein one or plural closed containers 11, three in this embodiment, which are subject to pinhole inspection. Meanwhile, in FIG. 1, a suction hole 13 is formed on an upper face of each of the chambers 12 of the pallet 1. The pallet 1 is carried to an inspecting position as shown, by a conveyor 14 which is movable intermittently at a constant pitch.

The closed container 11 to be inspected is used to contain solid or liquid matter, for example, a tablet or a powder drug, and there is no limitation with respect to its material and configuration. Specifically, the container 11 may be, for example, various types of plastic bags, or molded products, and various types of metallic containers. In each of the closed container 11, gas is contained. For example, the gas may be helium gas, flon gas (a trademark name of a chlorofluorocarbon manufactured by Mitsui Fluorochemicals Co., Ltd.), nitrogen gas, carbon dioxide gas, or neon gas, of which helium gas is most preferred.

The gas leakage detecting unit 2 includes a gas detecting means 15 and an introducing pipe 17 provided with an electromagnetic on-off valve 16. The introducing pipe 17 engages with the suction hole 13 of the chamber 12 of the pallet 1, when the suction hole 13 reaches the inspecting position, so as to conduct leakage gas to the gas detecting means 15. The gas detecting means 15 per se is known, in which, for example, helium gas sucked together with air is ionized and passed through a magnetic field so that helium ions only are collected. At a site collecting the helium ions, a current proportional to amount of the helium gas leakage flows. At a resistor portion, the current is converted into voltage so that an analog signal showing the voltage is outputted.

Further, in this embodiment, an expansion and contraction means 18, for example, air cylinder, is disposed above a chamber 12 having a suction hole 13 coming to the inspecting position. Through this arrangement, in the case that the closed container 11 is a flexible one, the chamber 12 and the closed container 11 are pressed from above so that gas leakage may be facilitated in the event of a pinhole being present on the closed container 11. In the case that the closed container 11 is a rigid container, it may be arranged that the chamber 12 is brought under negative pressure so that gas leakage can be facilitated if a pinhole exists.

At the A/D converter 3, the analog signal is converted into a digital signal.

The first arithmetic unit 4 receives the digital signal and determines a slope of a regression line representing the relationship between the magnitude of the signal, namely voltage and time, that is, slope b in the equation $y=a+b\cdot X$ by a method of least squares.

Whilst, a maximum value of slope of a regression line for the same kind of a gas in air as the above-mentioned gas is preliminarily inputted to the first arithmetic unit 4. Then, it is judged at the first arithmetic unit 4 whether or not the difference between the value of slope b and the maximum value is within an allowable range, and if the difference falls out of the allowable range, an abnormality signal is outputted from the first arithmetic unit 4. In other words, in the case that a pinhole is present on a closed container 11 inspected, the abnormality signal is outputted.

The removing unit 5 includes a control panel 21 and a pusher means 22, for example, an air cylinder. Upon receipt of an abnormality signal from the first arithmetic unit 4 by the control panel 21, the control panel 21 outputs a signal to activate the pusher means 22 such that the corresponding pallet 1 containing the abnormal container 11 is pushed out of the line.

In this way, on the basis of detection data on the gas in the pallet 1, the difference between the value of the slope of the regression line and above-mentioned maximum value is taken as a basis for judgement. This permits accurate and reliable inspection for the presence of a pinhole with respect to closed containers, without being influenced by any environmental change, for example, presence or non-presence in the air of the same kind of gas the gas sealed in the closed container 11, and also facilitates removal of such container out of the line if a pinhole is present thereon.

In the fourth embodiment, helium gas is employed as the gas. It is understood, however, that the first embodiment is not limited to this arrangement.

Figure 2:
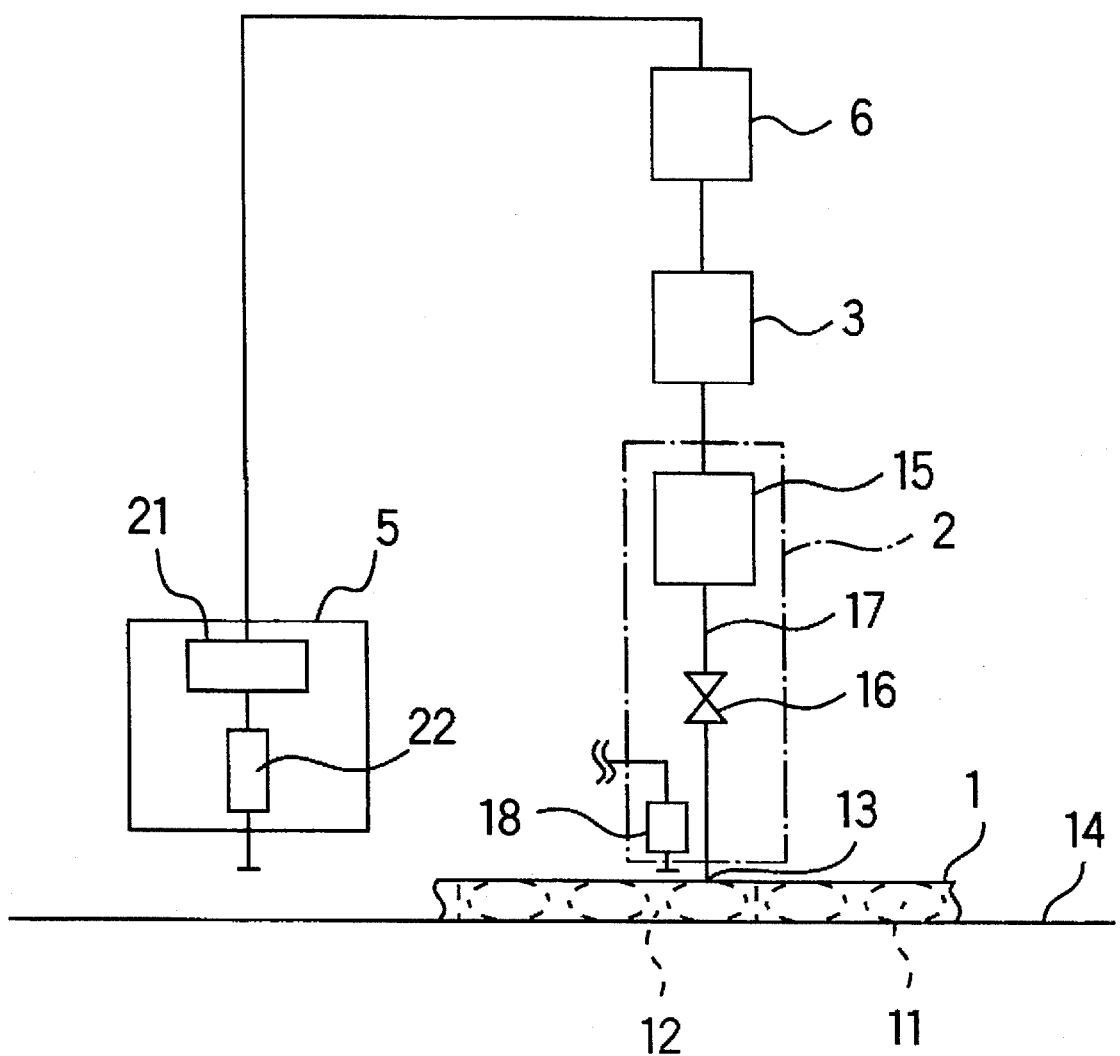
FIG. 2 is a diagram schematically showing a pinhole inspecting apparatus representing a second or a fourth embodiment of the present invention.

FIG. 2 illustrates a pinhole inspecting apparatus according to a second or a fourth embodiment of the present invention, which is substantially identical with the apparatus shown in FIG. 1 except that a second arithmetic unit 6 is incorporated in place of the first arithmetic unit 4. Therefore, parts corresponding to those shown in FIG. 1 are designated by like reference numerals and description thereof is omitted.

In this embodiment, the second arithmetic unit 6 receives a digital signal from the A/D converter 3 so as to calculate a difference between this digital signal and a previous digital signal. Data for producing the previous digital signal is detected at a time point preceding by a predetermined period a time point of detection of data for producing the digital data.

Whilst, in the second arithmetic unit 6, a maximum value is preliminarily inputted for the same kind of gas present in the air as above-mentioned gas, with respect to differences between similar digital signals at the same time interval as the above-mentioned predetermined time. Then, at the second arithmetic unit 6, it is judged whether or not the difference between the difference based on the data on the gas in the pallet 1 and above-mentioned maximum difference is within an allowable range, and if the difference falls out of the allowable range, the second arithmetic unit 6 outputs an abnormality signal.

As in the case of the previous embodiment, on the basis of detection data on the gas in the pallet 1, the difference between digital signals at two points of time is compared with above-mentioned maximum value, and the difference therebetween is taken as a basis for judgement. This permits accurate and reliable inspection for the presence of a pinhole with respect to closed containers, without being influenced by any environmental change, for example, presence or non-presence in the air of the same kind of gas as the gas sealed in the closed container 11, and also facilitates removal of such container out of the line if a pinhole is present therein.

In the fourth embodiment, helium gas is employed as the gas. It is understood, however, that the second embodiment is not limited to this arrangement.

Figure 3:
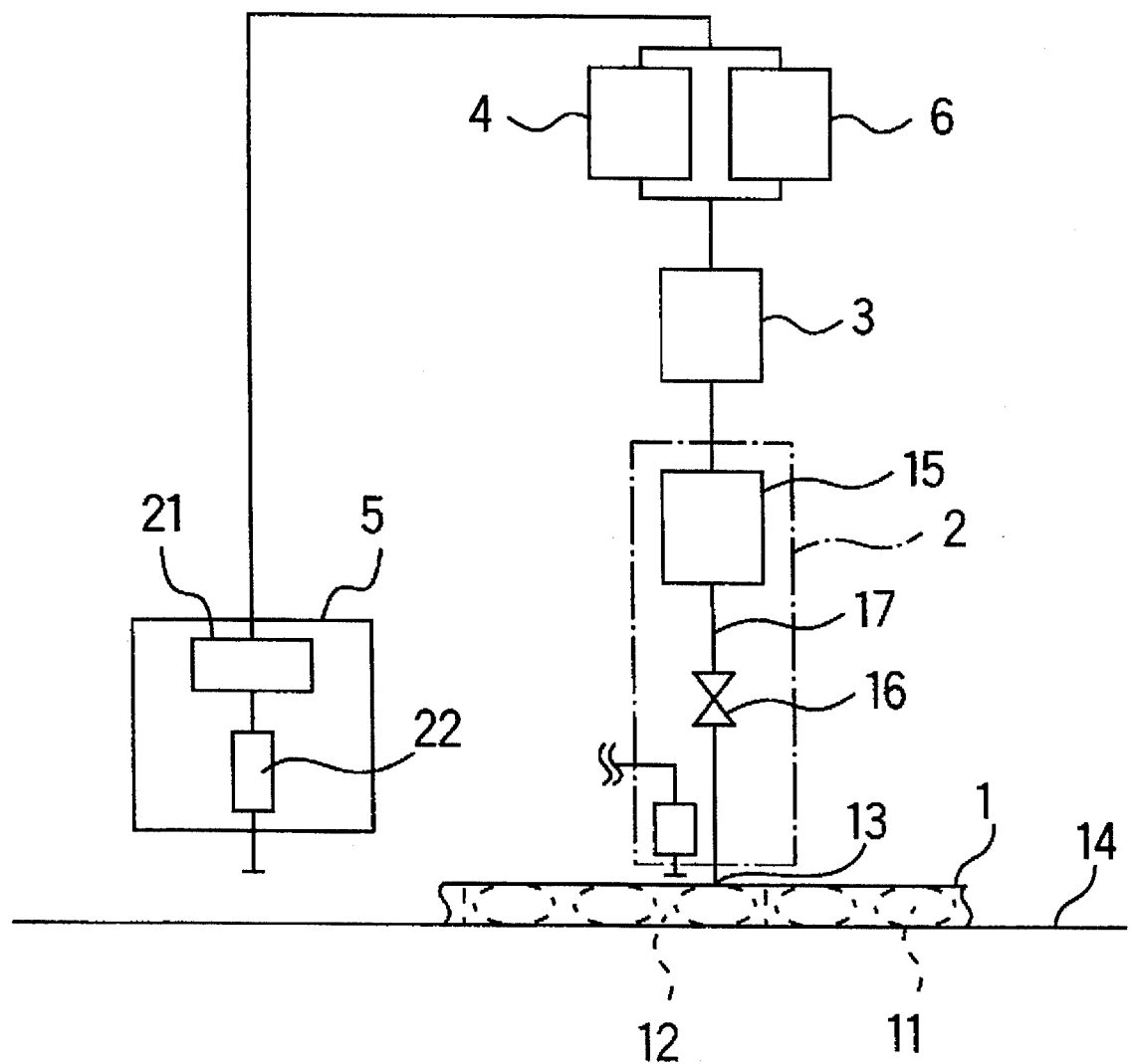
FIG. 3 is a diagram schematically showing a pinhole inspecting apparatus representing a third or a fourth embodiment of the present invention.

FIG. 3 illustrates a pinhole inspecting apparatus according to a third or a fourth embodiment of the present invention, which is substantially identical with the apparatus shown in FIG. 1 except that the apparatus shown in FIG. 3 includes a second arithmetic unit 6 in addition to the first arithmetic unit 4. Therefore, parts corresponding to those shown in FIG. 1 are designated by like reference numerals and description thereof is omitted.

In this embodiment, in the case that an abnormality signal is outputted in the apparatus shown in FIG. 1 and an abnormality signal is outputted in the apparatus shown in FIG. 2, an abnormality signal is outputted and a pallet corresponding to the abnormality signal is removed from the line.

By such arrangement, it becomes possible to inspect a pinhole on a closed container more accurately and more reliably than each of the apparatuses shown in FIGS. 1 and 2, irrespective of any environmental change, for example, presence or non-presence in the air of the same kind of gas as the gas sealed in the closed container 11. Further, it becomes possible to readily remove a container if it has a pinhole.

In the fourth embodiment, helium gas is employed as the gas. It is understood, however, that the third embodiment is not limited to this arrangement.

What is claimed is:

1. A pinhole inspecting apparatus comprising:

a pallet for dischargeably containing a closed container filled with a gas, the pallet having a suction hole;

a gas leakage detecting unit adapted to be connected at an inspecting position to the suction hole for communication with the interior of the pallet, such that when a gas of the same kind as said gas in the closed container is present in the interior of the pallet, the gas leakage detecting unit generates an analog signal having a voltage corresponding to an amount of leakage of the gas from the closed container per unit time;

an A/D converter for converting the analog signal into a digital signal; and a first arithmetic means for finding from the digital signal a slope of a regression line representing a relationship between a voltage corresponding to the magnitude of the signal and time, and calculating a difference between the value of the slope and a preliminarily inputted maximum slope value corresponding to the kind of gas in the closed container, the first arithmetic means also for outputting an abnormality signal when the difference falls out of an allowable range.

2. A pinhole inspecting apparatus comprising:

a pallet for dischargeably containing a closed container filled with a gas, the pallet having a suction hole;

a gas leakage detecting unit adapted to be connected at an inspecting position to the suction hole for communication with the interior of the pallet, such that when a gas of the same kind as said gas in the closed container is present in the interior of the pallet, the gas leakage detecting unit generates an analog signal having a voltage corresponding to an amount of leakage of the gas from the closed container per unit time;

an A/D converter for converting the analog signal into a current digital signal; and a second arithmetic means for calculating a difference between said current digital signal and a previous digital signal generated at a point in time traced back a predetermined period of time from a time of generation of said current digital signal;

the second arithmetic means also for outputting an abnormality signal when it is determined that a difference between said difference between said current and said previous digital signals and a preliminarily inputted maximum value corresponding to the kind of gas in the closed container during the same time interval as said predetermined period of time fall out of an allowable range.

3. A pinhole inspecting apparatus comprising:

a pallet for dischargeably containing a closed container filled with a gas, the pallet having a suction hole;

a gas leakage detecting unit adapted to be connected at an inspecting position to the suction hole for communication with the interior of the pallet, such that when a gas of the same kind as said gas in the closed container is present in the interior of the pallet, the gas leakage detecting unit generates an analog signal having a voltage corresponding to an amount of leakage of the gas from the closed container per unit time;

an A/D converter for converting the analog signal into a digital signal;

a first arithmetic means for finding from the digital signal a slope of a regression line representing a relationship between a voltage corresponding to the magnitude of the signal and time, and calculating a difference between the value of the slope and a preliminarily inputted maximum slope value corresponding to the kind of gas in the closed container, the first arithmetic means also for outputting an abnormality signal when the difference falls out of an allowable range; and a second arithmetic means for calculating a difference between said current digital signal and a previous digital signal generated at a point in time traced back a predetermined period of time from a time of generation of said current digital signal;

the second arithmetic means also for outputting an abnormality signal when it is determined that a difference between said difference between said current and said previous digital signals and a preliminarily inputted maximum value corresponding to the kind of gas in the closed container during the same time interval as said predetermined period of time fall out of an allowable range.

4. A pinhole inspecting apparatus as defined in any one of claims 1 to 3, wherein said gas is helium gas.

* * * * *